US012652731B1

(12) United States Patent
Choe

(10) Patent No.: US 12,652,731 B1
(45) Date of Patent: Jun. 9, 2026

(54) HYBRID INDUCTION-RESISTIVE HEATING SYSTEM FOR PROCESSING NEXT GENERATION ELECTRONIC MATERIALS

(71) Applicant: TYSTAR CORPORATION, Garden Grove, CA (US)

(72) Inventor: Wayne Ho Choe, Stanton, CA (US)

(73) Assignee: TYSTAR CORPORATION, Garden Grove, CA (US)

( * ) Notice: Subject to any disclaimer, the term of this patent is extended or adjusted under 35 U.S.C. 154(b) by 0 days.

(21) Appl. No.: 19/368,978

(22) Filed: Oct. 24, 2025

Related U.S. Application Data

(63) Continuation of application No. 19/364,920, filed on Oct. 21, 2025.

(51) Int. Cl.
*H05B 6/10* (2006.01)
*H05B 1/02* (2006.01)
*H05B 6/06* (2006.01)
*H05B 6/36* (2006.01)

(52) U.S. Cl.
CPC ........... *H05B 6/105* (2013.01); *H05B 1/0233* (2013.01); *H05B 6/06* (2013.01); *H05B 6/36* (2013.01)

(58) Field of Classification Search
CPC ........ H05B 6/105; H05B 1/0233; H05B 6/06; H05B 6/36; H05B 6/109; H05B 6/6491; H10P 72/0602; B01J 8/1836
See application file for complete search history.

(56) References Cited

U.S. PATENT DOCUMENTS

| | | | | |
|---|---|---|---|---|
| 5,676,869 | A | 10/1997 | Nakayama | |
| 5,683,507 | A * | 11/1997 | Barrett | C30B 23/00 117/200 |
| 8,419,893 | B2 | 4/2013 | Willwerth | |
| 10,595,365 | B2 | 3/2020 | Ouye | |
| 2003/0037724 | A1* | 2/2003 | Snyder | C30B 29/36 117/208 |
| 2011/0204036 | A1 | 8/2011 | Murobayashi | |
| 2012/0270169 | A1 | 10/2012 | Yamaga | |
| 2015/0360141 | A1* | 12/2015 | Tomar | B01J 8/1836 422/186.04 |
| 2016/0240369 | A1* | 8/2016 | Kudou | C30B 25/14 |
| 2018/0213608 | A1 | 7/2018 | Benjaminson | |
| 2020/0340116 | A1* | 10/2020 | Kikuchi | C23C 16/45544 |
| 2024/0341361 | A1* | 10/2024 | Zhang | A24F 40/70 |

FOREIGN PATENT DOCUMENTS

| | | |
|---|---|---|
| CN | 203367244 U | 12/2013 |
| CN | 118431060 A | 8/2024 |

* cited by examiner

*Primary Examiner* — Brian W Jennison
(74) *Attorney, Agent, or Firm* — DANE IP Law PC

(57) ABSTRACT

A hybrid induction-resistive heating system for processing semiconductor substrates includes a single induction coil surrounding a cylindrical susceptor and at least two resistive heaters disposed within the susceptor. The susceptor provides electromagnetic shielding to isolate the coil from the resistive heaters. A controller independently regulates heater output in response to temperature measurements within the heater to equalize temperatures across multiple zones of the susceptor. In operation, the coil provides rapid bulk heating while the resistive heaters supply localized spot heat, resulting in uniform thermal conditions along the length of the heater. The system achieves temperatures up to 2300° C. suitable for heat treating silicon carbide substrates in batch processes.

18 Claims, 15 Drawing Sheets

HYBRID INDUCTION-RESISTIVE HEATING SYSTEM FOR PROCESSING NEXT GENERATION ELECTRONIC MATERIALS

CROSS REFERENCE TO RELATED APPLICATIONS

This application is a continuation of U.S. application Ser. No. 19/364,920, filed on 2025 Oct. 21, the contents of which are expressly incorporated by reference herein.

STATEMENT RE: FEDERALLY SPONSORED RESEARCH/DEVELOPMENT

Not Applicable.

BACKGROUND

The various aspects and embodiments described herein relate to a heater for heat treating electronic materials.

Conventional semiconductor manufacturing systems use resistive heating to process silicon wafers at temperatures up to about 1200 degrees Celsius. However, emerging semiconductor materials such as silicon carbide require much higher processing temperatures, up to 2300 degrees Celsius, sustained for extended periods. Resistive heating alone is slow and energy-inefficient at reaching within a ramp-up time acceptable to the industry and maintaining these elevated temperatures.

Accordingly, there is a need in the art for an improved apparatus and method for heat treating these next-generation semiconductor materials.

BRIEF SUMMARY

The present disclosure provides a hybrid induction-resistive heating system and method for uniformly heat treating semiconductor substrates such as silicon carbide at temperatures up to approximately 2300 degrees Celsius. The system includes a single induction coil for rapid heating, a cylindrical susceptor that absorbs the radiofrequency (RF) wave energy from the induction coil, and at the same time, electromagnetically shields internal elements such as resistive heaters, and one or more resistive heaters disposed inside the susceptor for zone-specific trim heating. A controller regulates the resistive heaters in response to temperature measurements so that the end zones and center zone of the susceptor maintain substantially uniform temperatures. By combining induction heating for bulk power delivery with resistive heating for fine control, the heater overcomes end-loss effects and achieves a stable, uniform thermal profile along the length of the heater suitable for batch processing of next-generation semiconductor materials.

A heater for providing heat to workpieces includes a single induction coil, the coil defining a first end section and a second end section. A cylindrical susceptor is disposed within the coil, the susceptor having a first open end section and a second open end section opposite the first, and the susceptor having a length about equal to or greater than the length of the coil. A first resistive heater is disposed within the susceptor at the first open end section and aligned to the first end section of the coil, while a second resistive heater is disposed within the susceptor at the second open end section and aligned to the second end section of the coil. The first coil end section, first susceptor end, and first resistive heater define a first heating zone, and the second coil end section, second susceptor end, and second resistive heater define a second heating zone. A controller adjusts the power output of the first and second resistive heaters so that the temperature at the first zone and the temperature at the second zone are maintained at their respective target temperature ranges (e.g., within plus or minus 5 degrees Celsius, and more preferably within plus or minus 0.5 degrees Celsius).

The induction coil may have more windings at the first and second end sections compared to a middle section of the coil. In such a configuration, the number of windings per unit length decreases from the first and second end sections toward the middle section, and the decrease may be monotonic.

The heater may further include a third resistive heater disposed within the susceptor between the first and second resistive heaters, the third resistive heater defining a third zone. The controller adjusts the heat output of the third resistive heater so that the temperature at the third zone is about the temperatures at the first and second zones within their respective target temperature ranges. By way of example and not limitation, the target temperature range of the third zone may be within plus or minus 5 degrees Celsius (more preferably plus or minus 0.5 degrees Celsius) or maintained with a controlled temperature gradient where the end point temperatures match those of the first and second zones to within plus or minus 5 degrees Celsius, and more preferably plus or minus 0.5 degrees Celsius.

The susceptor may be formed of graphite, silicon carbide-coated graphite, silicon carbide, ferrous alloys, or other RF-absorbing conductive materials suitable for high-temperature processing.

The heater may be configured so that the first and second temperatures are maintained within their target temperature ranges (e.g., to within plus or minus 5 degrees Celsius (more preferably, plus or minus 0.5 degrees Celsius) when the heater reaches steady state.

The heater may also be configured so that the first and second temperatures are maintained to within plus or minus 5 degrees Celsius (more preferably within plus or minus 0.5 degrees Celsius during a ramp-up stage to steady state.

The susceptor may have a thickness at least 2 times greater than the RF penetration depth generated by the induction coil.

A method of heating electronic substrates using the heater includes providing a heater as described above, the heater comprising a single induction coil defining first and second end sections, a cylindrical susceptor disposed within the coil and defining first and second open end sections, and first and second resistive heaters disposed within the susceptor at the first and second open end sections and aligned with the first and second coil end sections to define first and second heating zones. A plurality of electronic substrates formed of high-temperature materials, such as of silicon carbide are placed into the susceptor cavity. The induction coil is operated to inductively heat the susceptor, and the first and second resistive heaters are operated to resistively heat the first and second zones. The controller adjusts the resistive heaters so that the temperature at the first zone is about the temperature at the second zone (e.g., within plus or minus 10 degrees Celsius and more preferably plus or minus 0.5 degrees Celsius).

The method may further include providing the induction coil with more windings at its first and second end sections compared to the middle section. In such a configuration, the number of windings per unit length decreases from the end sections toward the middle section, and the decrease may be monotonic.

The method may further include disposing a third resistive heater within the susceptor between the first and second resistive heaters, the third resistive heater defining a third heating zone, and controlling the third resistive heater so that the temperature at the third zone is substantially equal to the target temperature ranges of the first and second zones (e.g., within plus or minus 5 degrees Celsius, and more preferably plus or minus 0.5 degrees Celsius or has a gradient with end point temperatures matching the first and second zone temperatures to within plus or minus 10 degrees Celsius, and more preferably plus or minus 0.5 degrees Celsius).

The method may further include forming the susceptor of graphite or any other RF-absorbing material.

The method may further include maintaining the first and second zone temperatures to within plus or minus 5 degrees Celsius, and more preferably plus or minus 0.5 degrees Celsius, including during steady state operation.

The method may further include maintaining the first and second zone temperatures to within plus or minus 10 degrees Celsius and more preferably plus or minus 5 degrees Celsius during a ramp-up stage to steady state.

The method may further include providing a susceptor having a thickness at least 2 times the RF penetration depth generated by the single induction coil.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Referring now to the figures, the heater 10 disclosed herein is for fabricating next-generation semiconductor materials. While current semiconductor chips 12 are typically fabricated from silicon wafers, emerging semiconductor technologies utilize materials such as silicon carbide (SiC). These advanced materials require processing temperatures of up to 2300° C. sustained for approximately 30 minutes or longer. Conventional resistive heating methods, which are commonly used to heat silicon wafers up to 1200 degrees Celsius, are inefficient for reaching and maintaining the higher temperatures needed for next-generation electronic materials such as SiC, due to their low energy efficiency and slow ramp-up speeds.

Figure 4:
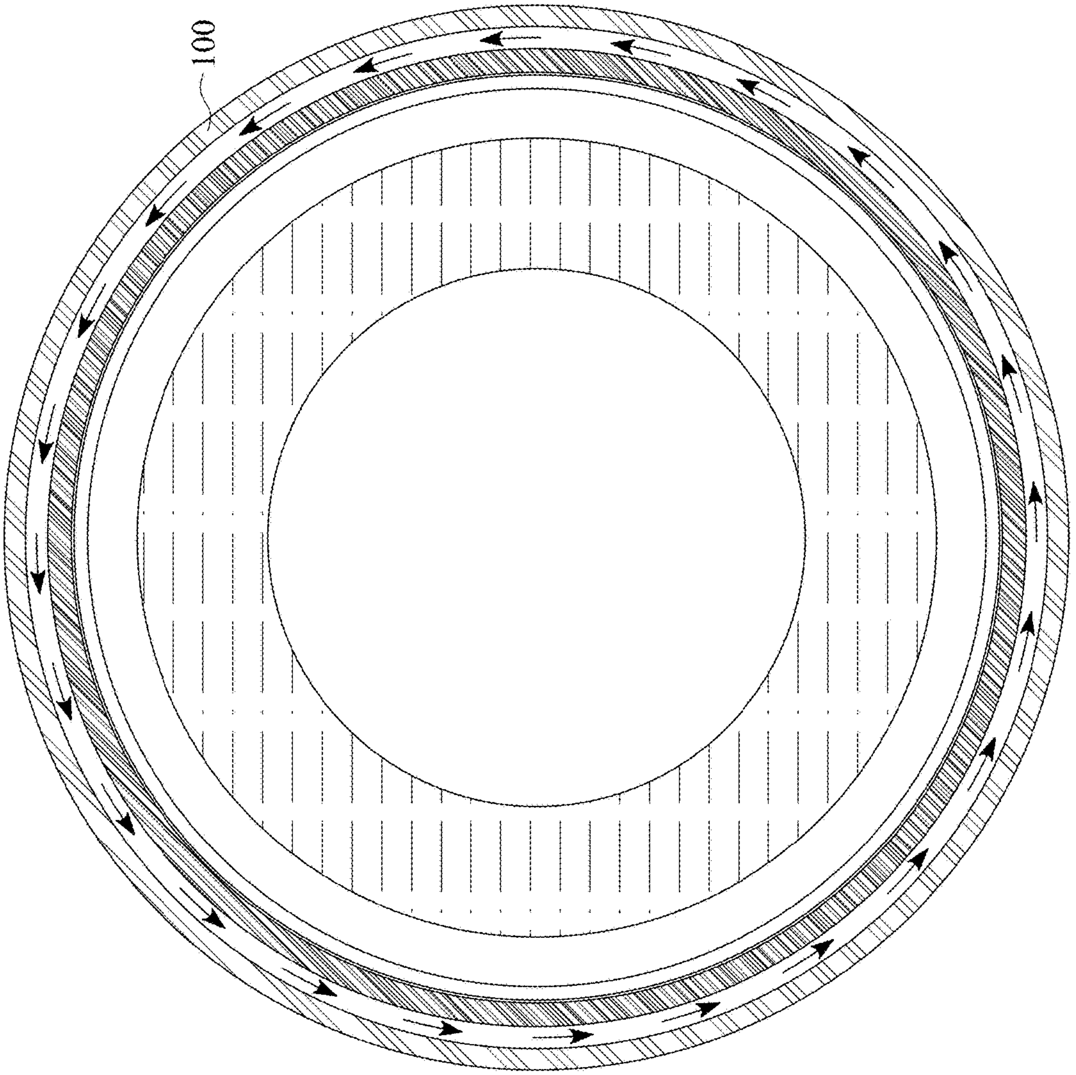
FIG. 4 is a transverse cross sectional view of the heating system illustrating the induction coil wound around a quartz tube with ceramic insulators.

The heater 10 disclosed herein provides a faster alternative. An induction heater including a single induction coil 100 (see, e.g., FIG. 4) offers rapid temperature increase but if used alone suffers from non-uniform heat distribution along the length of the heater 10. This non-uniformity can lead to inconsistencies in the thermal treatment of the substrates, affecting device performance and yield.

The heater 10 disclosed herein addresses this problem by providing a method and apparatus for achieving a uniform thermal profile using a hybrid heating approach. Specifically, the heater 10 employs the single induction coil 100 in combination with at least two independently controlled resistive heating elements 300, 302 (see FIGS. 3, 3A, 10, and 11). These components are thermally and electromagnetically isolated from one another by a cylindrical susceptor 200 positioned between them (see FIGS. 3 and 10). In particular, the susceptor 200 is sandwiched between the single induction coil 100 on the outside and the resistive heating elements 300, 302 on the inside.

Figure 1:
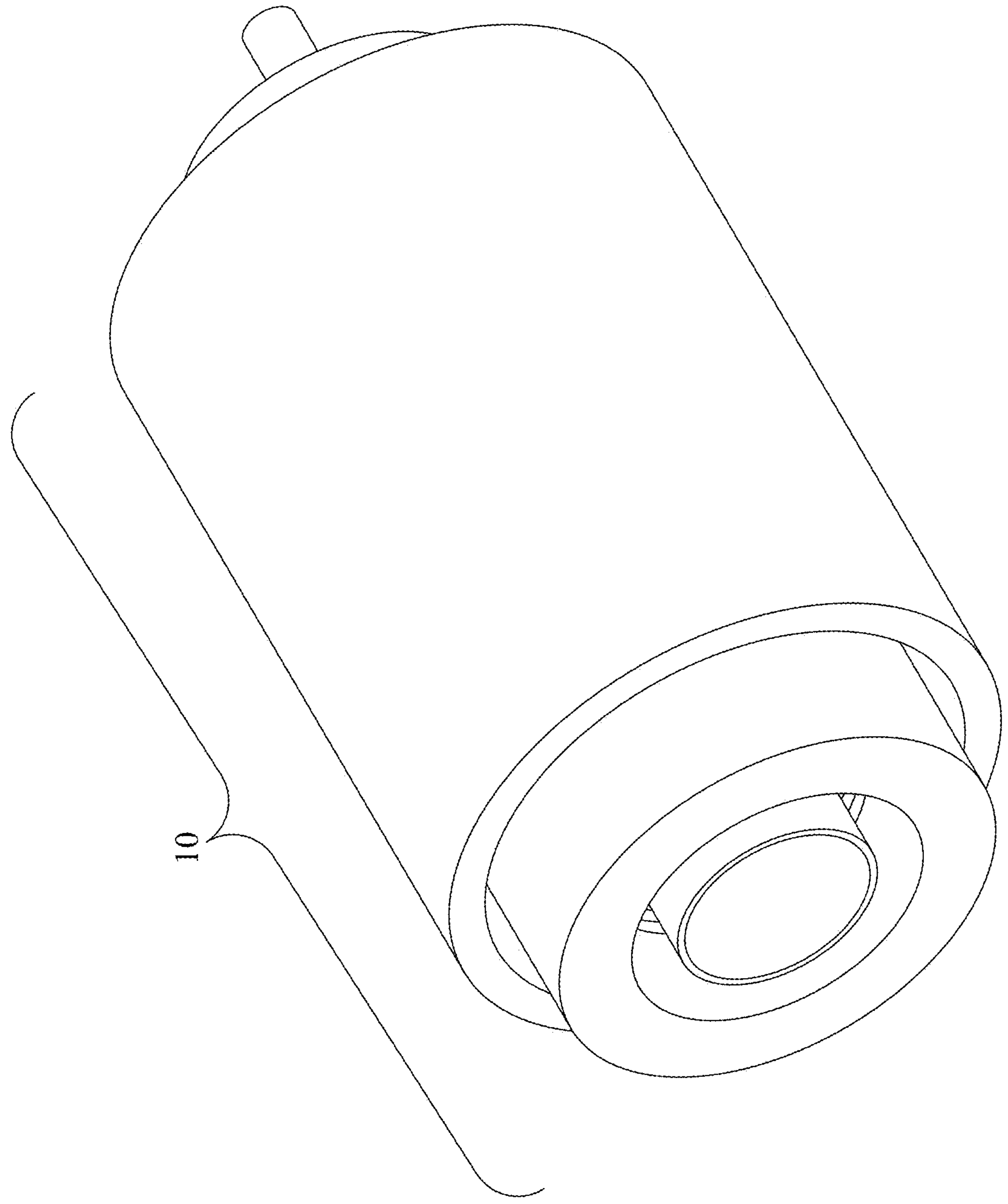
FIG. 1 is a perspective view of a hybrid induction-resistive heating system.
Figure 2:
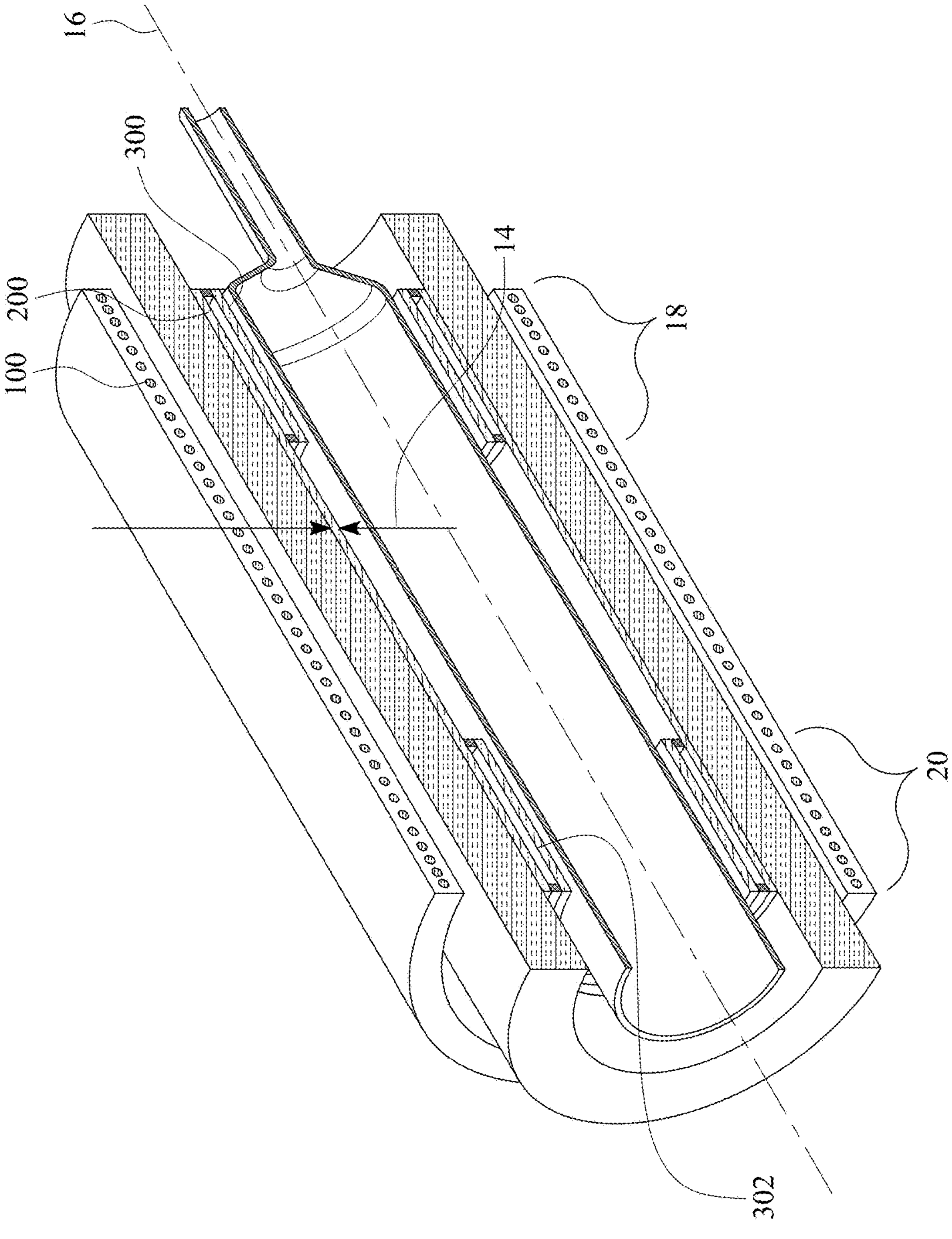
FIG. 2 is a cross sectional view of the heating system shown in FIG. 1 and illustrating the relative positioning of the induction coil, susceptor, and two resistive heaters.

The susceptor 200 functions as an RF shield, preventing electromagnetic interference-such as mutual inductance and eddy current interactions between the induction coil 100 and the resistive heating elements 300, 302. The electromagnetic shielding eliminates the potential complication of temperature control dynamics caused by the electromagnetic interference between the induction coil and the resistive heaters. The susceptor 200 is formed with a thickness 14 (see FIG. 2) at least 2 times the RF wave penetration depth 8 of the coil 100 to ensure full shielding effectiveness (see FIG. 10) for the resistive heaters 300, 302.

Figure 8:
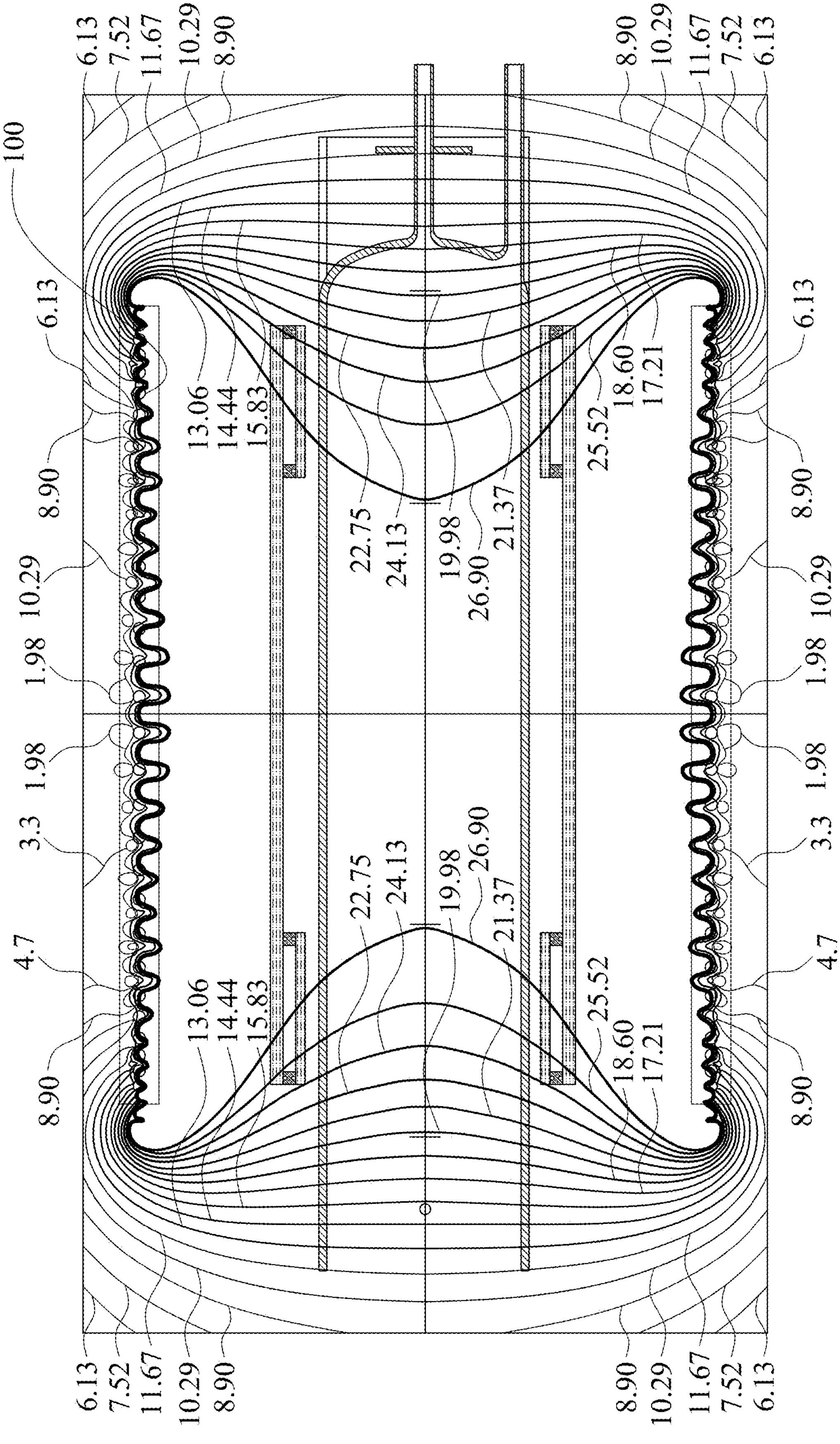
FIG. 8 illustrates a single coil with two resistive heaters and is a graph illustrating the magnetic field (|B|) profile generated by the induction coil alone, suggesting reduced heating of the susceptor at the opposed end portions.
Figure 8A:
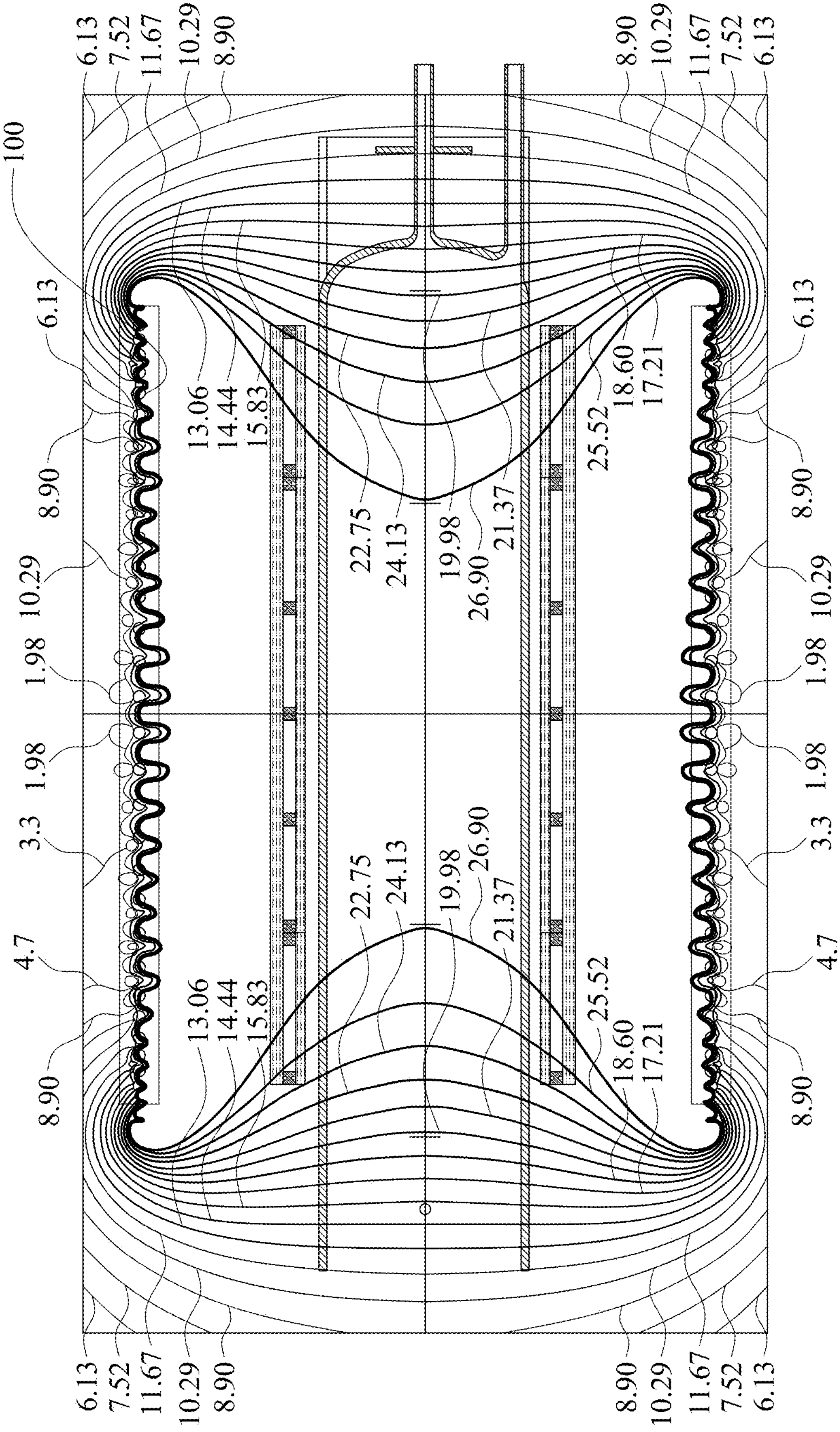
FIG. 8A illustrates a single coil and three resistive heaters and is a graph illustrating an improved magnetic field (|B|) profile achieved by varying coil winding density, showing partial compensation of magnetic end losses.
Figure 9:
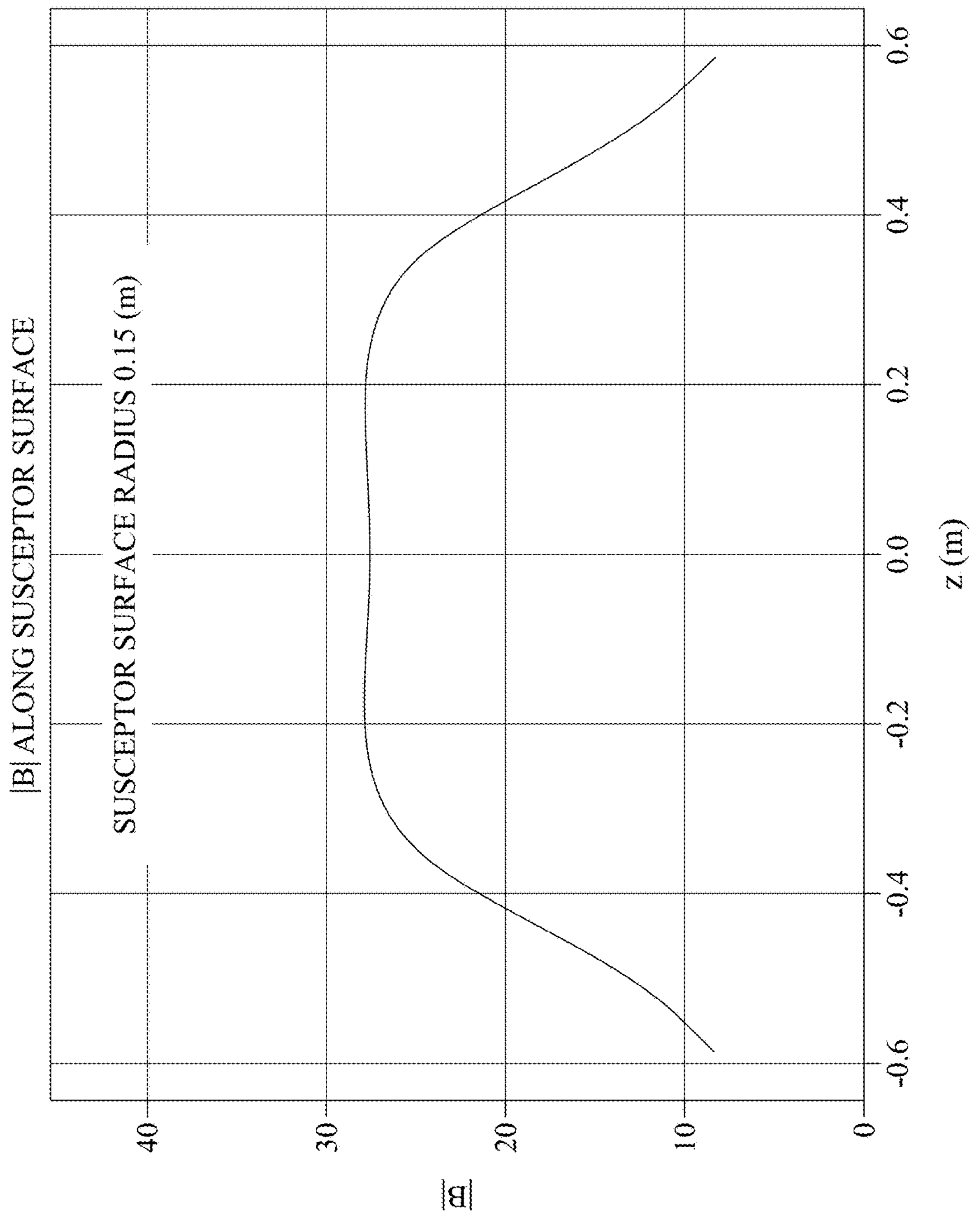
FIG. 9 is a plot showing the calculated magnetic field distribution (|B|) along the susceptor surface, which determines the induction power density in the susceptor across its length.

The resistive heaters 300, 302 are positioned along the interior surface of the cylindrical susceptor 200, while the induction coil 100 is wound around its exterior (see FIGS. 3, 3A, 10, and 11). FIG. 8 illustrates the typical magnetic field generated by the single coil 100. The heat power density profile produced by the induction coil 100 in the susceptor 200 is proportional to the square of the magnetic field. Typically, there would be a drop-off in heat intensity toward the opposed end portions of the heater 10. As shown in FIG. 9, there is a drop off at the end portions of the coil if the coil density was the same throughout the length of the coil. However, the coil 100 disclosed herein is more tightly wound up at the end portions. As such, this increase the heat generation at the opposed end portions to mitigate any drop off in heat at the end portions. However, this solution alone does not fully resolve the heat distribution issue.

The distribution of power density within the susceptor 200 may be analyzed and optimized using a static magnetic field model, which effectively mimics the RF magnetic field. Because the induction coil 100 is operated at relatively low radio frequencies, generally less than 100 kHz, the wavelength of the RF field is on the order of kilometers, vastly larger than the one-meter or shorter dimensions of the solenoid coil 100, and so the near-field distribution of the RF magnetic field is closely approximated by that of a static magnetic field produced by a DC electric current flowing in the same induction coil. Applying the Biot-Savart law to the geometry of the induction coil 100 allows the static B-field distribution to be calculated, which in turn corresponds directly to the induced electric field within the susceptor 200 through Faraday's law. Since the local heating power density is proportional to the square of the induced electric field, the static B-field model accurately predicts relative variations in power deposition along the susceptor length. This analysis confirms that adjusting winding density at the coil ends and supplementing with resistive heaters 300, 302, 304 produces a flat thermal profile across the cavity.

Figure 3:
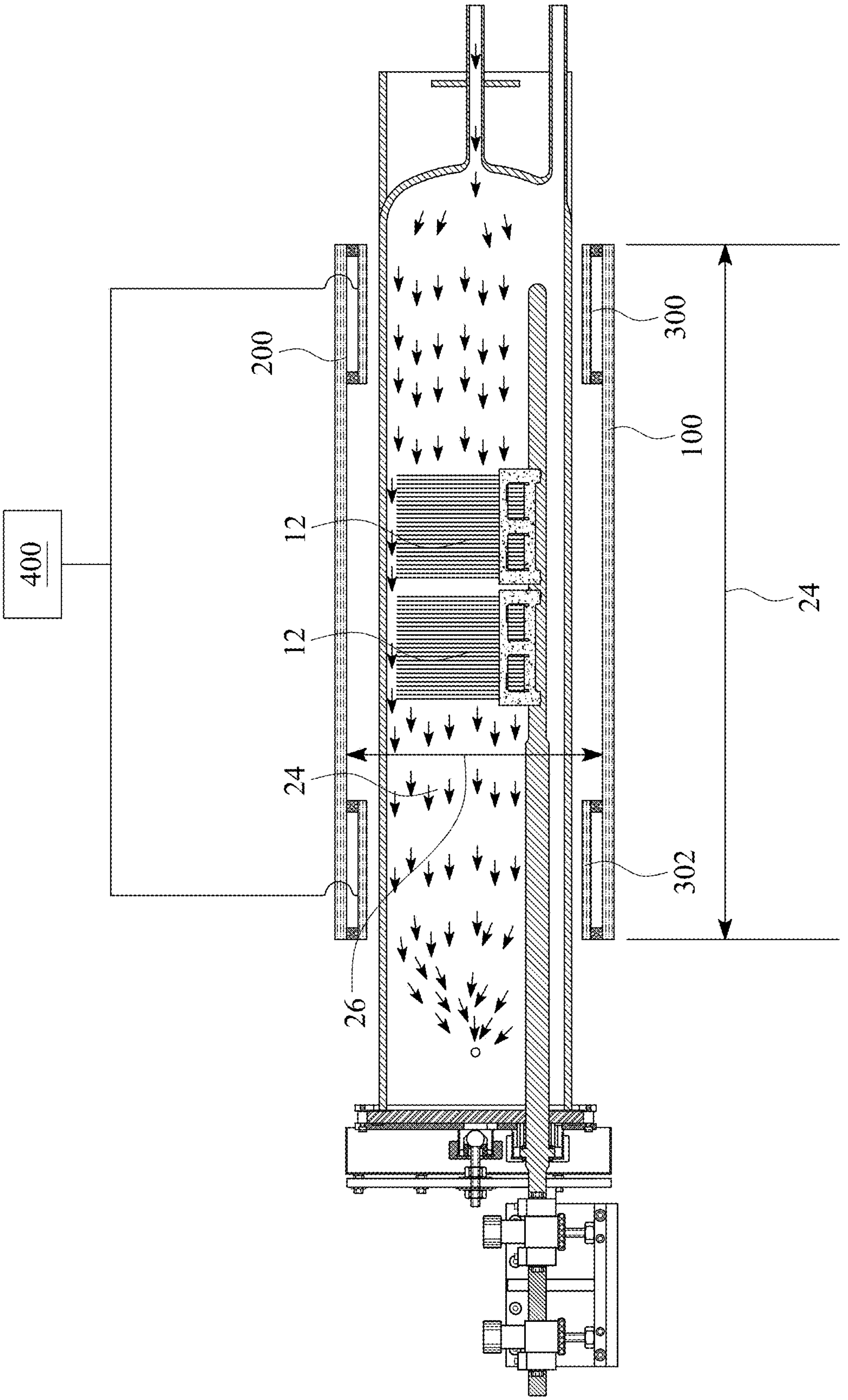
FIG. 3 is a diagrammatic representation of the heater including the susceptor, two resistive heaters, induction coil, and associated inert gas flow pathways.
Figure 10:
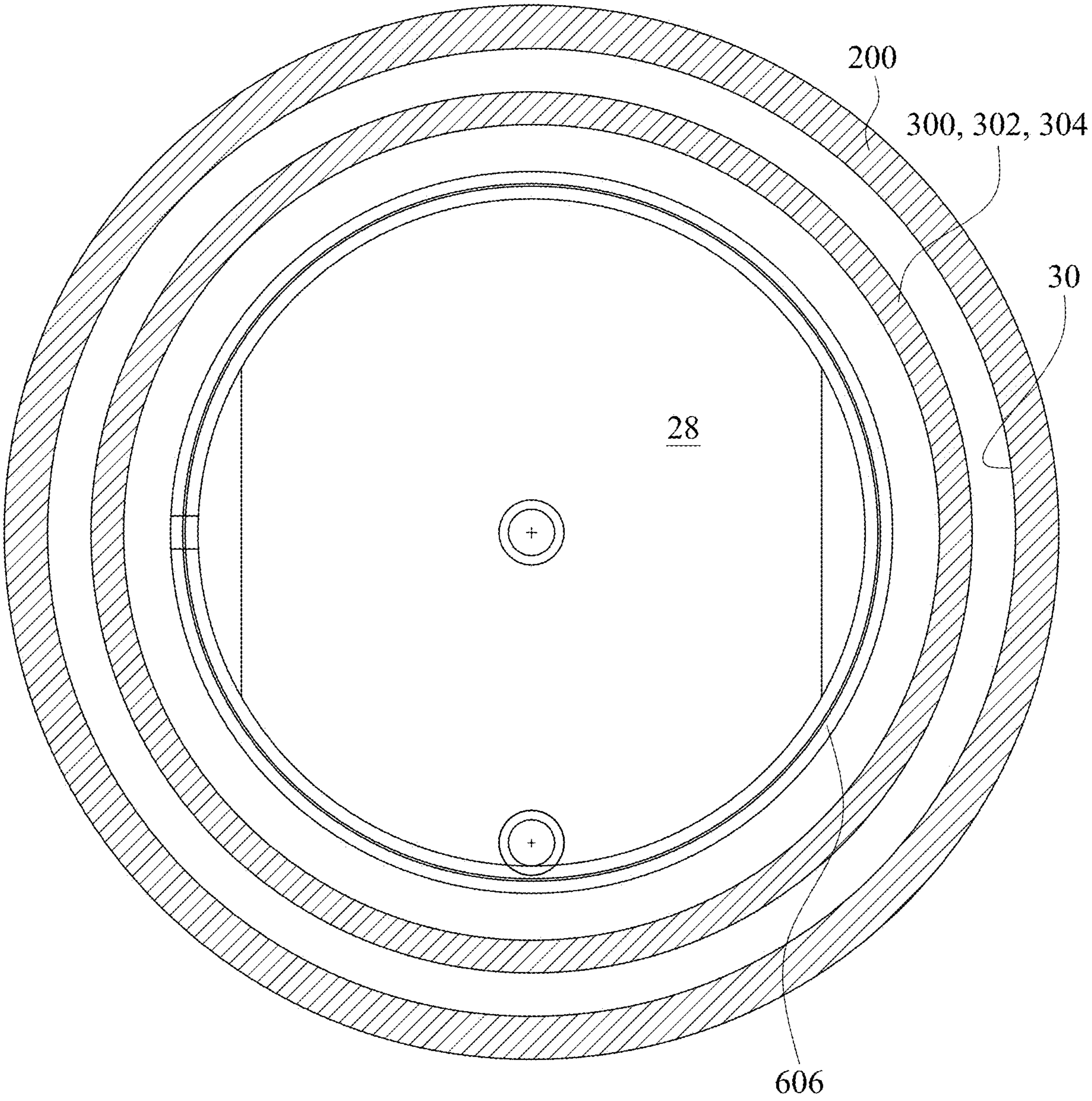
FIG. 10 is a transverse cross sectional view illustrating the susceptor, induction coil, and resistive heaters in relation to one another.

To achieve a uniform temperature along a longitudinal axis 16 (see FIG. 2) of the heater 10, the resistive heating elements 300, 302 are strategically placed—at least near the end regions—and are independently controlled to introduce more or less heat (see FIGS. 3 and 10). These resistive heaters 300, 302 provide supplementary heat at the end portions where the induction coil 100 may be less effective, resulting in a consistent uniform thermal profile across the entire length of the susceptor 200.

Maintaining the semiconductor materials at 2300° C. for the required duration necessitates precise thermal management. Because heat generation varies along the length of the induction heater, the resistive heaters 300, 302 are dynamically adjusted to compensate for these fluctuations. This active control of heat by the resistive heaters ensures uniform heating of the substrates throughout the entire processing period and along the entire length of the susceptor 200.

The hybrid induction-resistive heater 10 and associated methods for providing high-temperature, uniform heating may be utilized to process (e.g., heat treat) advanced electronic materials such as silicon carbide.

Figure 6:
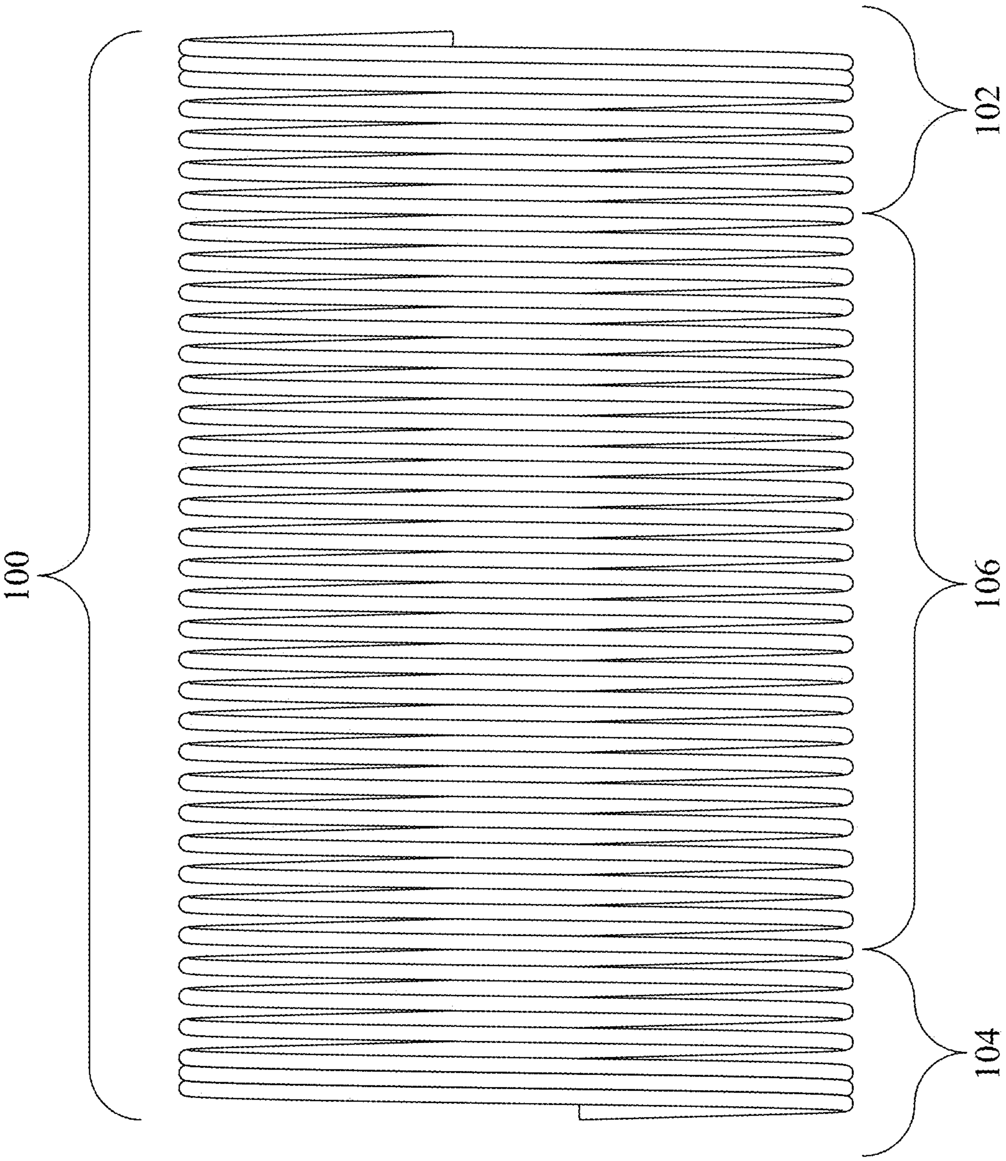
FIG. 6 is a plan view showing the coil winding geometry and end-winding density.

The heater 10 may include a single induction coil 100 that serves as a rapid-ramp heat source (see FIG. 4) upon start up of the heater and upon transitioning from a dwell temperature to a target temperature. The coil 100 may have a length 22 5 inches to more than 100 inches. The coil 100 may define a first end section 102, a second end section 104, and an intermediate middle section 106. To counteract end losses due to the open ends of the heater cavity 24 and the effect of diverging RF magnetic field at both ends, the winding density at the end sections 102, 104 may be greater than that of the middle section 106. The density reduction may occur in a monotonic manner (see FIG. 6). The winding density may be constant throughout the entire middle section 106. By way of example and not limitation, the end sections 102, 104 may have about 1.1 to 10 times (more preferably 1.1 to 5 times) more turns per unit length than the middle section 106. The number of turns per inch may vary from approximately 1 to 30, depending on the heating requirements and size of the chamber 24. These winding variations enable the coil 100 to generate more heat at the end portions where heat is otherwise lost out of the open ends compared to the middle portion.

Figure 5:
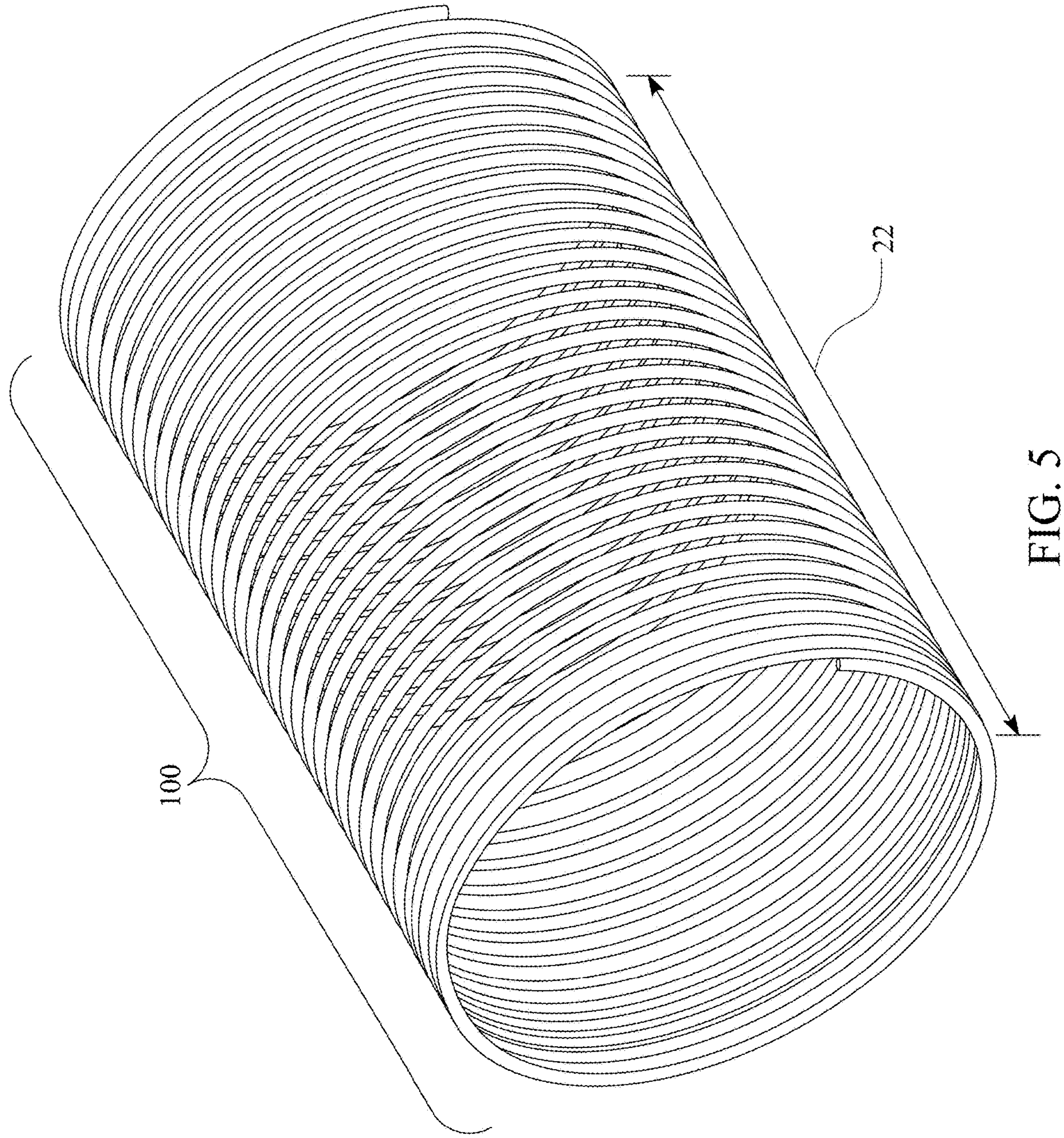
FIG. 5 is a perspective view of the coil winding geometry and end-winding density.

A cylindrical susceptor 200 is disposed concentrically within the coil 100 (see FIGS. 3 and 10). The susceptor 200 has a first open end 202 and a second open end 204 and defines an elongated cavity for receiving electronic substrates. The susceptor 200 may have a length 24 (see FIG. 3) that is 5% shorter, equal to, or greater than the coil length 22 (see FIG. 5), and in some embodiments extends 5-10% or more beyond the coil length 22 so that the induction field terminates within the susceptor 200. The susceptor 200 is preferably fabricated from graphite, although other conductive materials such as silicon carbide and ferrous materials may be used. The wall thickness 14 (see FIG. 2) of the susceptor 200 may be at least 2 times the RF penetration depth, typically about 10-20 millimeters at operating frequencies of less than 100 kHz, with thicknesses of 30 millimeters or more permissible for greater stability. The inner diameter 26 (see FIG. 3) of the susceptor 200 may be selected to accommodate the size of the substrate 12 being heat treated, ranging from about 110 millimeters for 100 millimeter wafers to about 300 millimeters for 200 millimeter wafers. The outer diameter is determined by the chosen wall thickness, which is preferably in the range of 38-68 to balance shielding from the coil 100.

Figure 3A:
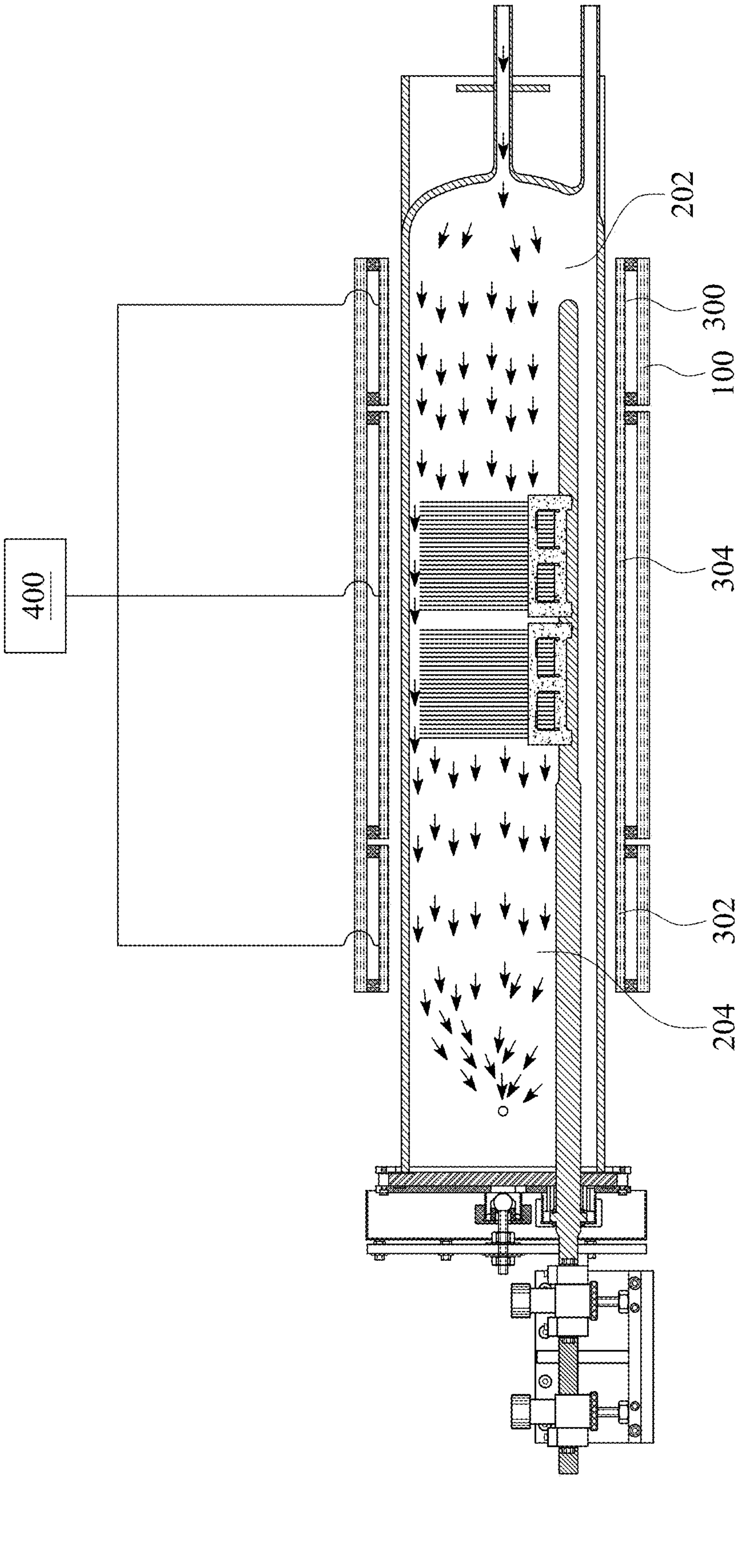
FIG. 3A is a diagrammatic representation of the heater including the susceptor, three resistive heaters, induction coil, and associated inert gas flow pathways.

Two or more resistive heaters 300, 302, 304 are disposed within susceptor 200 to accommodate heat variations from the coil 100 (see FIGS. 3, 3A, and 10). But, it is also contemplated that one resistive heater may be disposed within the susceptor 200. A first resistive heater 300 is located near the first open end 202 in axial alignment with the first coil end section 102, and a second resistive heater 302 is located near the second open end 204 in axial alignment with the second coil end section 104. Each resistive heater 300, 302 may have an axial length of about 20 to 100 millimeters. Optionally, a third resistive heater 304 may be positioned between the first and second resistive heaters 300, 302 to define a central heating zone (see FIG. 3A). The resistive heaters 300, 302, 304 may be continuous rings, segmented rings, continuous switchbacks or helical bands. Each heater may be radially spaced about 3 to 10 millimeters from the susceptor inner wall to provide electrical isolation.

The resistive heaters 300, 302, 304 may be connected to a programmable controller 400 that independently regulates power output to each zone. In typical operation, the induction coil 100 provides the majority of heating, such as 50-90 percent of the total, while the resistive heaters 300, 302, 304 supply supplemental heat in the range of 10-50 percent at their respective zones. This division of power ensures that the resistive heaters 300, 302, 304 are not overloaded while maintaining temperature uniformity.

Figure 11:
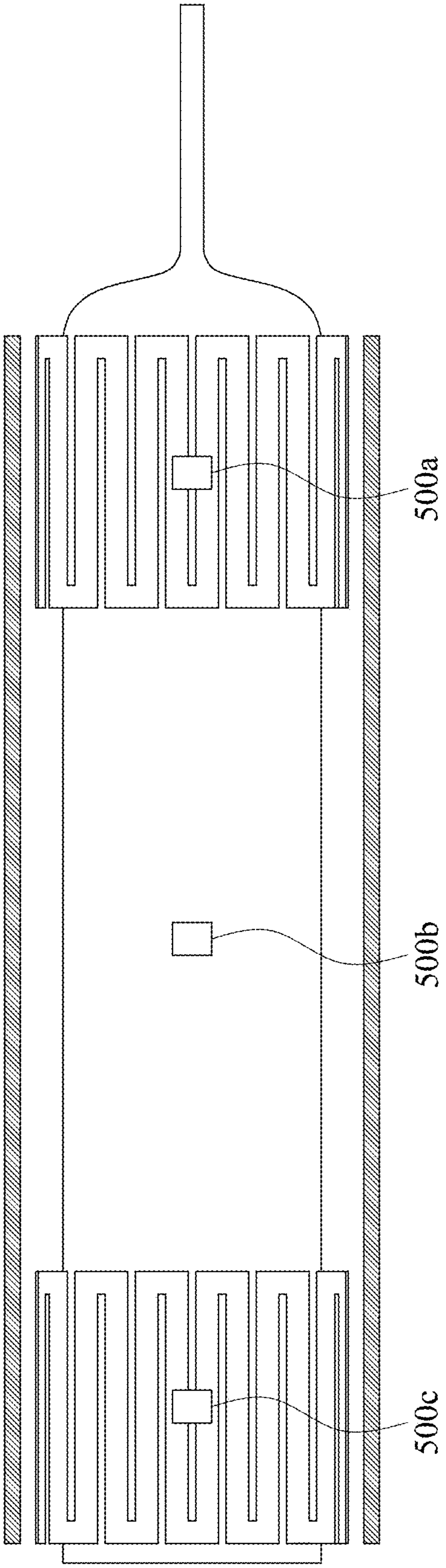
FIG. 11 is a schematic diagram showing the arrangement of the susceptor, induction coil, and two resistive heaters at opposed end portions of the heater.
Figure 11A:
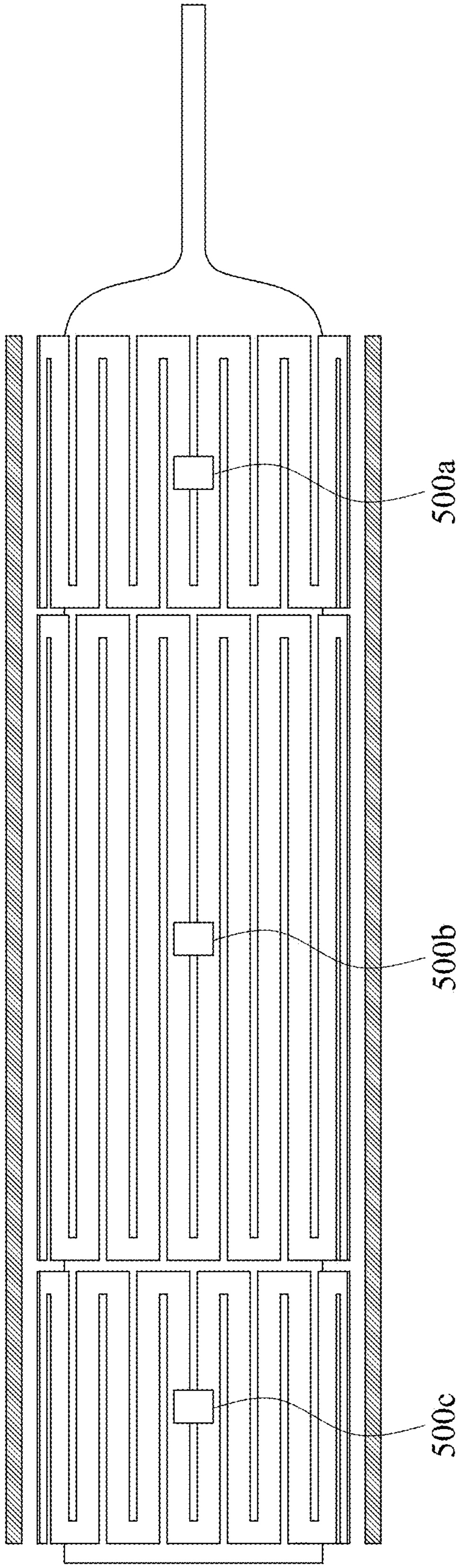
FIG. 11A is a schematic diagram showing the arrangement of the susceptor, induction coil, and three resistive heaters, two at opposed end portions of the heater and one disposed in the middle.

Temperature sensors 500*a, b, c* (see FIGS. 11 and 11A) may be disposed along a length of the susceptor 200 to provide real-time monitoring of the thermal profile within the processing cavity 28 (see FIG. 10). The sensors 500*a, b* may be positioned at or near the first open end 202, the second open end 204, and optionally at one or more sensors 500*c* may be positioned at locations intermediate along the axial length of the susceptor 200. By way of example and not limitation, as shown in FIGS. 11 and 11A, at least one temperature sensor 500*a, b, c* may be placed in each thermal zone defined by the resistive heaters 300, 302, 304, such that each sensor 500*a, b, c* is capable of measuring temperature (temperature of the gas or the susceptor surface temperature) in its respective zone.

Figure 7:
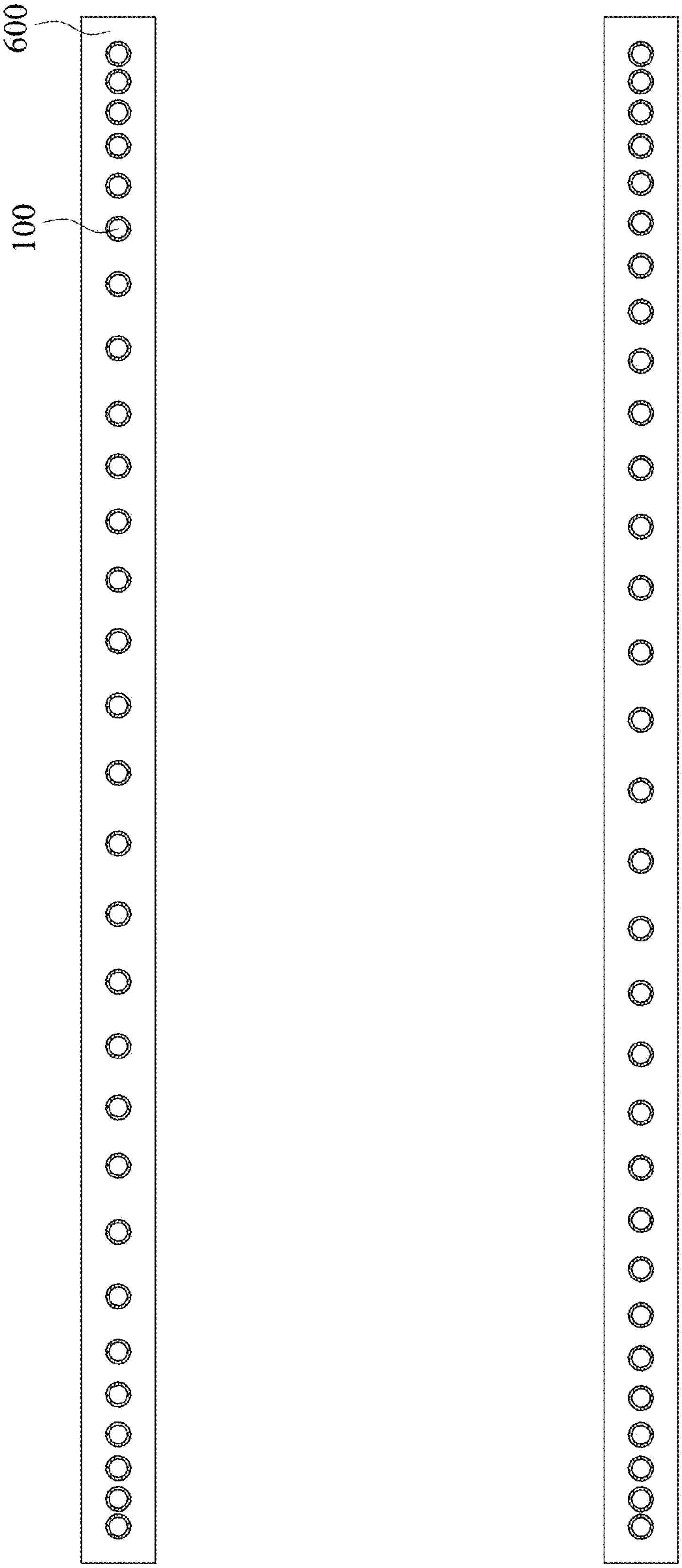
FIG. 7 is a cross sectional view of the coil embedded within a potting material such as epoxy.

The sensors 500_a, b, c_ may be constructed to measure the temperature of the gas flowing through the cavity of the susceptor 200 (see FIG. 7). Measuring the gas temperature provides a direct representation of the thermal environment surrounding the substrates, which is critical for heat treatment. Sensors suitable for this purpose include high-temperature thermocouples suspended within the gas flow, optical fiber probes designed to sense radiative and convective heat from the process atmosphere, and infrared gas sensors configured to detect the thermal state of the flowing medium. By way of example and not limitation, a Type C thermocouple encased in an alumina sheath may be positioned within the gas stream to reliably monitor cavity gas temperatures up to 2300° C.

Additionally or alternatively, the sensors 500_a, b, c_ may be used to measure surface temperature of the susceptor 200 or of a substrate 12 disposed within the cavity 28. Surface measurements may be obtained by embedding thermocouples directly into the susceptor wall, bonding thermocouples onto the back surface of a substrate carrier, or by directing optical pyrometers through sight ports to capture radiative emissions from the susceptor internal surface 30 or substrate surfaces (see FIG. 10). Such surface measurements may supplement gas temperature readings and provide additional feedback for fine-tuning the control of the resistive heaters 300, 302, 304.

If a temperature deviation from the set point for a zone is detected by one or more of the sensors 500_a, b, c_ along the length of the susceptor 200, the controller 400 adjusts the power supplied to the resistive heaters 300, 302, 304 to restore uniformity of the temperature along the length of the chamber 28. By way of example and not limitation, if a lower temperature is sensed near the first open end 202, the controller 400 may increase power to the first resistive heater 300, thereby raising the local temperature of the first zone. Conversely, if an elevated temperature is detected near the second open end 204, the controller 400 may decrease power to the second resistive heater 302, thereby lowering the temperature of the second zone. Similarly, a central temperature imbalance may be corrected by adjusting the output of the third resistive heater 304 when present or by adjusting the first resistive heater 300 which heats the air flowing into the chamber 28.

In this manner, the feedback from the sensors 500 enables dynamic closed-loop control of the thermal profile along a length of the chamber 28. The system continually compares the measured temperatures to a setpoint profile and modulates the resistive heaters 300, 302, 304 accordingly. Such dynamic adjustment allows the system to maintain tighter tolerances of plus or minus 5 degrees Celsius (more preferably plus or minus 0.5 degrees Celsius), and permissible variations of plus or minus 10 degrees Celsius (more preferably plus or minus 5 degrees Celsius) during ramp-up.

Figure 2A:
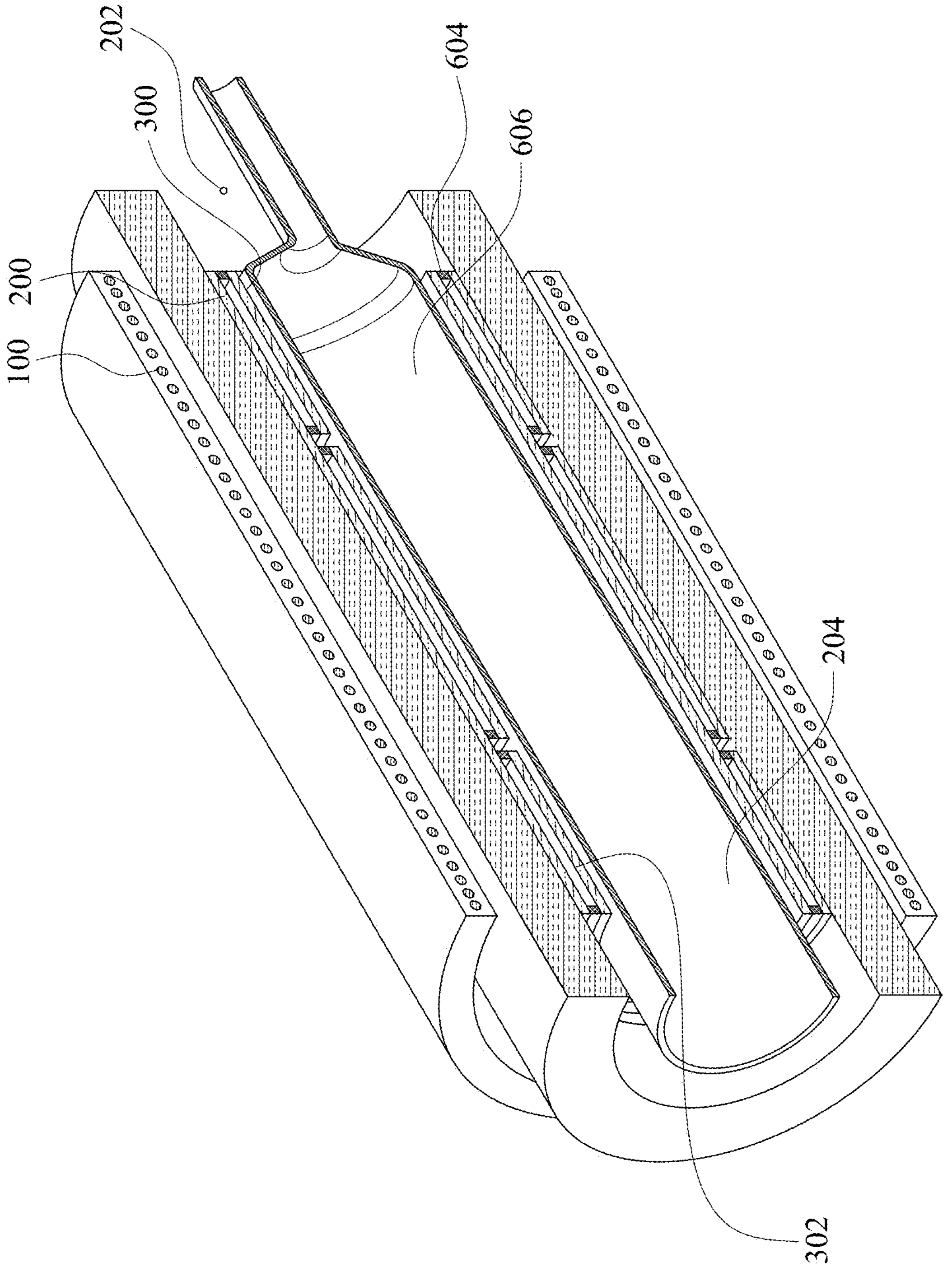
FIG. 2A is a cross-sectional view of the heating system shown in FIG. 1 and having three resistive heaters.

Auxiliary structures may be employed without altering the fundamental design. A quartz tube 600 (see FIG. 10) may be inserted between the induction coil 100 and the insulator to contain inert gas flow inside the quartz tube (see FIG. 4). High-temperature-rated ceramic spacers 604 (see FIG. 2A) may be used to maintain alignment. A silicon carbide process tube 606 (see FIGS. 2A and 10) may be positioned inside the susceptor 200. Inert gas inlet and outlet ports may be provided to flow gas therethrough.

A method of heating electronic substrates using the heater 10 includes placing wafers or other workpieces 12 into the cavity 28 of the susceptor 200 (see FIG. 3). For substrates of 100 millimeters, the susceptor 200 may be dimensioned with an inner diameter of about 150 millimeters, whereas for 200 millimeter substrates, the inner diameter may be about 300 millimeters. Once loaded, the chamber 28 within the liner 606 may be purged with an inert gas such as argon, nitrogen, or helium to maintain a controlled atmosphere.

The induction coil 100 is energized at a frequency generally less than 100 kHz. Eddy currents induced within the susceptor 200 wall raise its temperature, heating the cavity rapidly. Because the coil 100 is wound with greater density at its end sections 102 and 104 (see FIG. 5), additional magnetic field strength is directed toward the ends, thereby reducing the end-loss effect characteristic of induction heating.

As the susceptor 200 heats, the resistive heaters 300, 302, and optionally resistive heater 304 are energized (see FIGS. 3 and 3A). Each heater provides localized heating in its zone, and the controller 400 adjusts the outputs so that the temperatures of the first zone, second zone, and optional third zone are maintained at their respective target temperatures. During steady state, the system can maintain temperature uniformity in the center zone to within plus or minus 5 degrees Celsius (more preferably plus or minus 0.5 degrees Celsius) or a temperature gradient in the center zone such that its end point temperatures match the target temperatures of the first and the second zones to within plus or minus 5 degrees Celsius (more preferably plus or minus 0.5 degrees Celsius). During ramp-up, tolerances of plus or minus 10 degrees Celsius (more preferably plus or minus 5 degrees Celsius) may be acceptable, while during standard (steady-state) operation plus or minus 5 degree Celsius (more preferably plus or minus 0.5 degree Celsius) tolerance is achievable. By allocating 50-90 percent of the heating to the induction coil 100 and 10-50 percent to the resistive heaters 300, 302, 304, the system establishes rapid heating while maintaining fine temperature control so that temperatures along the length of the cavity are uniform as the material is being heat treated.

The combination of the induction coil 100 and the resistive heaters 300, 302, 304 ensures that the substrates 12 are uniformly exposed to the intended temperature profile along the axial length of the cavity 28 (see FIG. 10). This allows the heater 10 to sustain extreme temperatures, up to approximately 2300° C., for processing times of 30 minutes or longer with a uniform temperature. Such thermal performance is necessary for the fabrication of next-generation semiconductor devices using materials such as silicon carbide.

The heater 10 operates as part of a batch process (see FIG. 3). Initially, the induction coil 100 and resistive heaters 300, 302, and optionally resistive heater 304 are activated to raise the temperature within the cavity 28 of the susceptor 200 to approximately one-half of the target heat-treating temperature. Once this intermediate temperature is reached, the heater 10 is opened and a batch of substrates 12 is inserted into the cavity 28 defined between the first open end 202 and the second open end 204 of the susceptor 200. The heater 10 is then closed and the induction coil 100 together with the resistive heaters 300, 302, 304 are energized so that the internal temperature rises to the full target processing temperature. The substrates are maintained at the target temperature for a predetermined period of time sufficient to complete the desired heat treatment. The controller 400 adjusts the resistive heaters 300, 302, 304 to maintain a uniform temperature along a length of the chamber 28.

After the heat treatment period has elapsed, the controller 400 reduces power to the induction coil 100 and the resistive heaters 300, 302, 304 so that the temperature within the susceptor 200 is lowered to a dwell temperature. The dwell temperature is typically around 1000° C. Once the system has cooled to a safe handling temperature, the heater 10 is opened and the heat treated substrates 12 are removed. Thereafter, a new batch of substrates 12 may be inserted through the open end 202, the heater 10 closed, and the induction coil 100 and resistive heaters 300, 302, 304 re-activated to again raise the internal temperature of the susceptor 200 to the desired processing temperature. In this way, the apparatus and method enable continuous batch operation, wherein successive groups of substrates 12 are processed under controlled uniform high-temperature conditions required for the fabrication of next-generation semiconductor materials.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A heater for providing heat treatment to a batch of silicon carbide wafers as gas flows from an inlet to an outlet, the heater comprising:

a single cylindrical induction coil defining a first end section which is located closer to the inlet compared to the outlet and a second end section which is located closer to the outlet compared to the inlet;

a cylindrical susceptor disposed inside the single cylindrical induction coil, the susceptor having a cylindrical configuration and defining a first open end section which is located closer to the inlet compared to the outlet and a second open end section opposite the first open end section, the second open end section being located closer to the outlet compared to the inlet, the susceptor defining a length which is about equal to or greater than the length of the single induction coil, wherein the induction heating from the single cylindrical induction coil and the cylindrical susceptor provides for a rapid rise in temperature within a workspace;

a first resistive heater circumferentially disposed inside the cylindrical susceptor at the first open end section and aligned to the first end section of the single induction coil, wherein the cylindrical susceptor shields the first resistive heater from the electromagnetic waves of the single cylindrical induction coil to minimize electromagnetic interference preventing the first resistive heater to finely control a temperature within the heater, the first resistive heater being located closer to the inlet compared to the outlet;

a second resistive heater disposed inside the susceptor at the second open end section and aligned to the second end section of the single induction coil, wherein the cylindrical susceptor shields the second resistive heater from the electromagnetic waves of the single cylindrical induction coil to minimize electromagnetic interference preventing the second resistive heater to finely control the temperature within the heater, the second resistive heater being located closer to the outlet compared to the inlet;

wherein the first end section of the single induction coil, the first open end section of the susceptor and first resistive heater define a first zone which is located closer to the inlet compared to the outlet, and wherein the second end section of the single induction coil, the second open end section of the susceptor and the second resistive heater define a second zone which is located closer to the outlet compared to the inlet;

a controller for adjusting heat output of the first and second resistive heaters so that a first temperature at the first zone within a first cavity defined by the first resistive heater is equal to a second temperature at the second zone within a second cavity defined by the second resistive heater to within plus or minus 0.5 degree Celsius as gas flow in from the inlet through the first zone to the second zone and out the outlet while the heater is heating the workpiece;

wherein the single induction coil is configured to provide rapid bulk heating during temperature ramp-up while the shielded resistive heaters provide fine, independent trimming to maintain thermal uniformity.

2. The heater of claim 1 wherein the induction coil has more windings at the first and second end sections compared to a middle section of the induction coil.

3. The heater of claim 1 wherein the number of windings per unit length of the single coil decreases from the first and second opposed sections to the middle section.

4. The heater of claim 3 wherein the decrease is monotonic.

5. The heater of claim 1 further comprising a third resistive heater disposed between the first and second resistive heaters within the susceptor and defines a third zone, wherein the controller adjusts heat output of the third resistive heater so that a third temperature at the third zone matches the first and second temperatures to within plus or minus 5 degrees Celsius.

6. The heater of claim 1 wherein the susceptor is formed of graphite, silicon carbide-coated graphite, silicon carbide, ferrous alloys, or other RF-absorbing conductive materials suitable for high-temperature processing.

7. The heater of claim 1 wherein the first and second temperatures are maintained to within plus or minus 5 degrees Celsius when the heater reaches steady state.

8. The heater of claim 1 wherein the first and second temperatures are maintained to within ±10° C. during a ramp up stage to steady state.

9. The heater of claim 1 wherein a thickness of the susceptor is at least 2 times an RF wave penetration depth generated by the single induction coil.

10. The heater of claim 1, further comprising a plurality of temperature sensors disposed along the susceptor, with at least one sensor per heating zone providing real-time feedback to the controller for closed-loop temperature control within plus or minus 5 degrees Celsius.

11. A method of heat treating a batch of silicon carbide wafers using a heater, the method comprising:

providing the heater, the heater having:

a single cylindrical induction coil defining a first end section and a second end section;

a cylindrical susceptor positioned inside the single cylindrical induction coil, the susceptor having a cylindrical configuration and defining a first open end section and a second open end section opposite the first open end section, the susceptor having a length about equal to or greater than the length of the single induction coil;

a first resistive heater disposed inside the cylindrical susceptor at the first open end section and aligned with the first end section of the single induction coil to define a first zone;

a second resistive heater disposed inside the cylindrical susceptor at the second open end section and aligned with the second end section of the single induction coil to define a second zone;

disposing a plurality of electronic substrates comprising high-temperature materials, such as silicon carbide within the susceptor;

operating the induction coil to inductively heat the susceptor;

operating the first and second resistive heaters to resistively heat respective first and second zones within the susceptor;

flowing gas through the inlet and outlet while performing the operating steps;

controlling the first and second resistive heaters using a controller so that a first temperature at the first zone is equal to a second temperature at the second zone to within plus or minus 5 degrees Celsius and the temperature in the center zone has a uniform temperature profile to within plus or minus 0.5 degrees Celsius;

wherein the induction coil provides rapid temperature ramp-up and the shielded resistive heaters provide precise control that compensates for end-loss effects, achieving substrate temperature uniformity of +0.5° C. in steady state.

12. The method of claim 11, further comprising providing the induction coil with more windings at the first and second end sections compared to a middle section of the induction coil.

13. The method of claim 11, further comprising disposing a third resistive heater within the susceptor between the first and second resistive heaters defining a third zone, and controlling the third resistive heater using the controller so that a third temperature at the third zone has a flat or a gradient temperature profile matching the temperatures of the first and the second zones at both ends of the third zone to within plus or minus 5 degrees Celsius.

14. The method of claim 11, wherein the providing step further comprising forming the susceptor of graphite or any other RF-absorbing material.

15. The method of claim 11, wherein the controlling step further comprises maintaining the first and second temperatures to within plus or minus 5 degrees Celsius of target temperatures.

16. The method of claim 11, wherein the controlling step further comprises maintaining the first and second temperatures to within plus or minus 5 degrees Celsius when the system reaches steady state.

17. The method of claim 11, wherein the controlling step further comprises maintaining the first and second temperatures to within plus or minus 10 degrees Celsius during a ramp up stage to steady state.

18. The method of claim 11, wherein the providing step further comprises providing a susceptor wherein a thickness of the susceptor is at least 2 times an RF wave penetration depth generated by the single induction coil.

* * * * *